(12) United States Patent
Benayoun et al.

(10) Patent No.: US 6,675,291 B1
(45) Date of Patent: Jan. 6, 2004

(54) HARDWARE DEVICE FOR PARALLEL PROCESSING OF ANY INSTRUCTION WITHIN A SET OF INSTRUCTIONS

(75) Inventors: Alain Benayoun, Cagnes sur Mer (FR); Jean-Francois Le Pennec, Nice (FR); Claude Pin, Nice (FR); Patrick Michel, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/558,792

(22) Filed: Apr. 26, 2000

(30) Foreign Application Priority Data

May 31, 1999 (EP) .............................................. 99480041

(51) Int. Cl.[7] .............................. G06F 9/44; G06F 9/40; G06F 9/45
(52) U.S. Cl. ........................ 712/236; 712/241; 717/144; 717/155; 717/156
(58) Field of Search ................................. 717/156, 138, 717/155, 144, 160; 712/236, 235, 234, 245, 241

(56) References Cited

U.S. PATENT DOCUMENTS 5,787,287 A * 7/1998 Bharadwaj ................... 717/144
5,850,553 A * 12/1998 Schalansker et al. ........ 717/236
5,854,926 A * 12/1998 Kingsley et al. ............. 717/156

* cited by examiner

Primary Examiner—Daniel H. Pan
(74) Attorney, Agent, or Firm—Scully, Scott, Murphy & Presser; Robert M. Trepp, Esq.

(57) ABSTRACT

Hardware device for parallel processing a determined instruction of a set of instructions having a same format defining operand fields and other data fields, the execution of this determined instruction being represented as an algorithm comprising a plurality of processes, the processing of which depending on decisions. Such a device comprises means (22–30) for activating the processing of one or several processes (32–38) determined by the operand fields of the instruction, decision macroblocks (12–20) each being associated with a specific instruction of the set of instructions, only one decision marcoblock being selected by the determined instruction in order to determine which are the process(es) to be activated for executing the determined instruction.

6 Claims, 4 Drawing Sheets

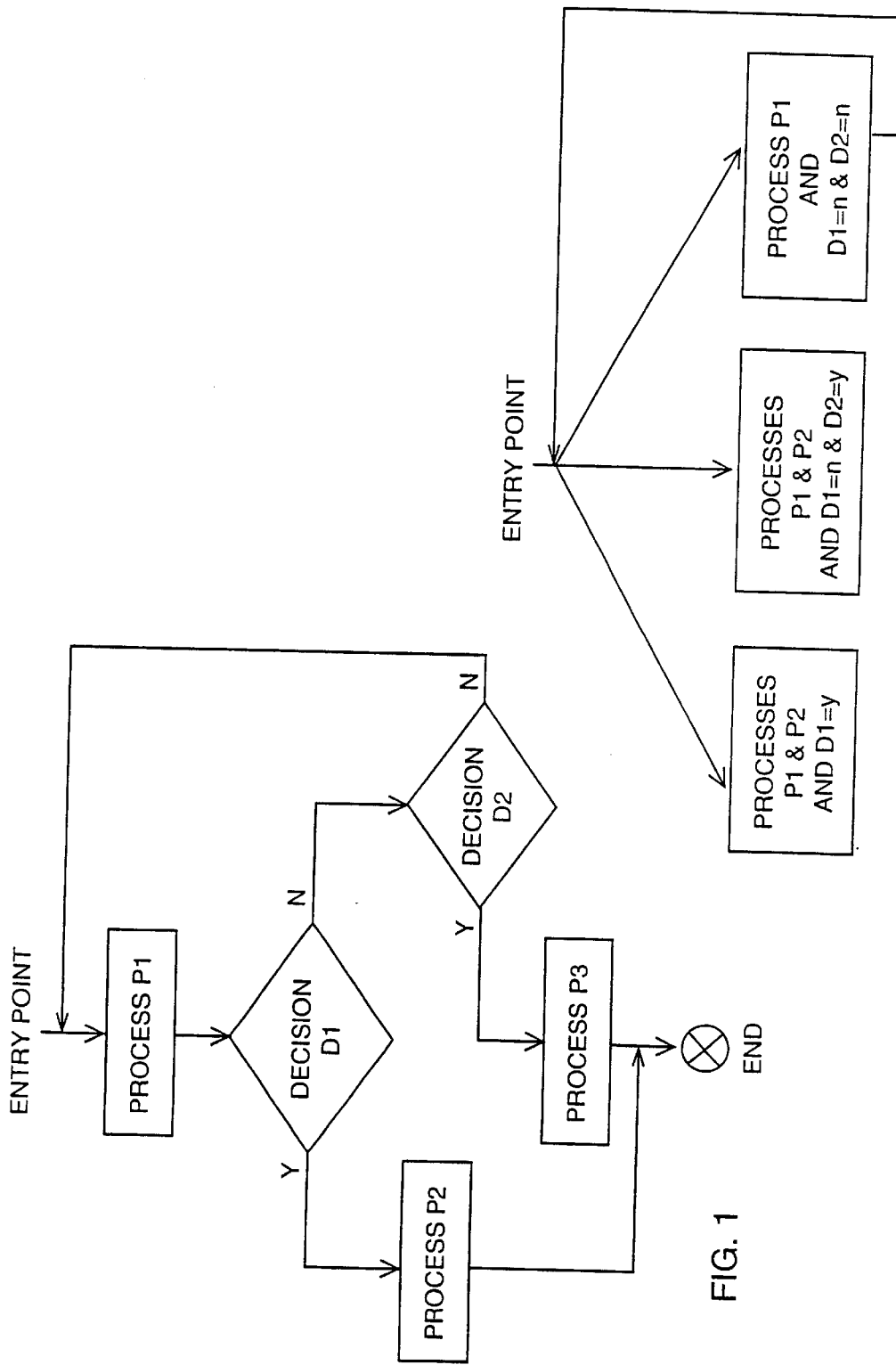

HARDWARE DEVICE FOR PARALLEL PROCESSING OF ANY INSTRUCTION WITHIN A SET OF INSTRUCTIONS

BACKGROUND OF THE INVENTION

1. Technical Field

The present invention relates generally to the execution of instructions belonging to a set of instructions having a same format, and relates in particular to a hardware device for parallel processing of any instructions within a set of instructions.

2. Prior Art

The execution of any instruction within a set of instructions having the same format in a computer, processor or any other data processing unit, can be graphically represented by an algorithm including a plurality of processes and decisions. Such decisions of a binary type enable, according to the operand fields of the instruction, to know which are the processes to be run for the execution of the instruction. In other words, each instruction corresponds to a specific combination of processes which is different from the other instructions due to the choice between two paths made at each decision which is met.

For example, a simple algorithm illustrated in FIG. 1 includes three processes P1, P2, P3 and two decisions D1, D2, and corresponds to the graphical representation of three instructions. The first instruction is represented by the algorithm flow when decision D1 is yes, that is when processes P1 and P2 are to be executed. The second instruction is represented by the algorithm flow when decision D1 is no and decision D2 is yes, that is when processes P1 and P3 are to be executed. Finally, the third instruction is represented by the algorithm flow when decision D1 is no and decision D2 is also no, that is when only process P1 is to be executed. Note that looping back to the entry point of the algorithm after decision D2 comes down to execute a new instruction within the set of instructions.

Each process may be independent or can depend on another process. Thus, in the first instruction which consists in executing processes P1 and P2 process P2 may depend upon the result of process P1 but may also be independent. Likewise for the second instruction where process P3 may depend on the result of process P1 or may be independent.

Today, the execution of an instruction represented by the algorithm illustrated in FIG. 1 is made on a sequential basis. This means that decision D1 is taken after process P1 has been executed, process P2 is executed after decision D1 has been determined as being yes, and process P3 can be executed only after decision D2 has been determined as being yes. Therefore, the state of the art does not enable an important speed in the run of the algorithm, principally when each instruction is dependant upon taking a lot of decisions during its execution.

SUMMARY OF INVENTION

The main object of the invention is to provide a programmable hardware enabling any instruction of a set of instructions to be executed in a parallel and exclusive way thereby resulting in a high execution speed.

The invention relates therefore to a hardware device for parallel processing a determined instruction of a set of instructions having a same format defining operand fields and other data fields, the execution of this determined instruction being represented as an algorithm comprising a plurality of processes, the processing of which depends on decisions. This device comprises means for activating the processing of one or several processes determined by the operand fields of the instruction, decision macroblock being each associated with a specific instruction of the set of instructions, only one decision macroblock being selected by the determined instruction in order to determine which are the process(es) to be activated for executing the determined instruction.

According to a preferred embodiment of the invention, each decision macroblock comprises a mask register having the same length as the determined instruction and containing a mask for masking the bits of the other data fields, and a value register containing a value having the same length as the determined instruction and composed of a defined part corresponding and being identical to the operand fields of the specific instruction, and combinatory logic means for logically combining the determined instruction with the contents of the mask register and the contents of the value register so that the output of the macroblock is 1 only when the determined instruction is the specific instruction associated with the macroblock.

BRIEF DESCRIPTION OF THE DRAWINGS

Preferred embodiments of the present invention will now be described, by way of example only, with the reference to the accompanying drawings in which:

FIG. 1 shows a simple example of algorithm with three processes and three decisions representing a set of three instructions.

FIG. 2 shows the same algorithm as in FIG. 1, wherein each branch associated with an instruction is represented by a single block.

DETAILED DESCRIPTION OF THE PREFERRED EMBODIMENTS OF THE INVENTION

As mentioned above in reference to FIG. 1, a set of instructions can be represented by an algorithm wherein each instruction is an algorithm flow comprising a combination of processes and decisions. Therefore, the algorithm can also be schematically represented by a plurality of branches starting from an entry point as illustrated in FIG. 2 and wherein each branch represents one instruction of the set of instructions. In the present case, the first instruction is represented by the block "processes $P1_e$ P2 and D1=y", the second instruction is represented by the block "process $P1_e$ P3 and D1=$n_e$ D2=y",and the third instruction is represented by the block "process P1 and D1=$n_e$ D2=n". The third instruction is particular since it loops back to the entry point, this means starting a new instruction of the set of instructions.

The essential feature of the invention is to have all the branches of the algorithm respectively associated with instructions processed in parallel and to select the branch which corresponds to the instruction which has to be executed.

Figure 3:
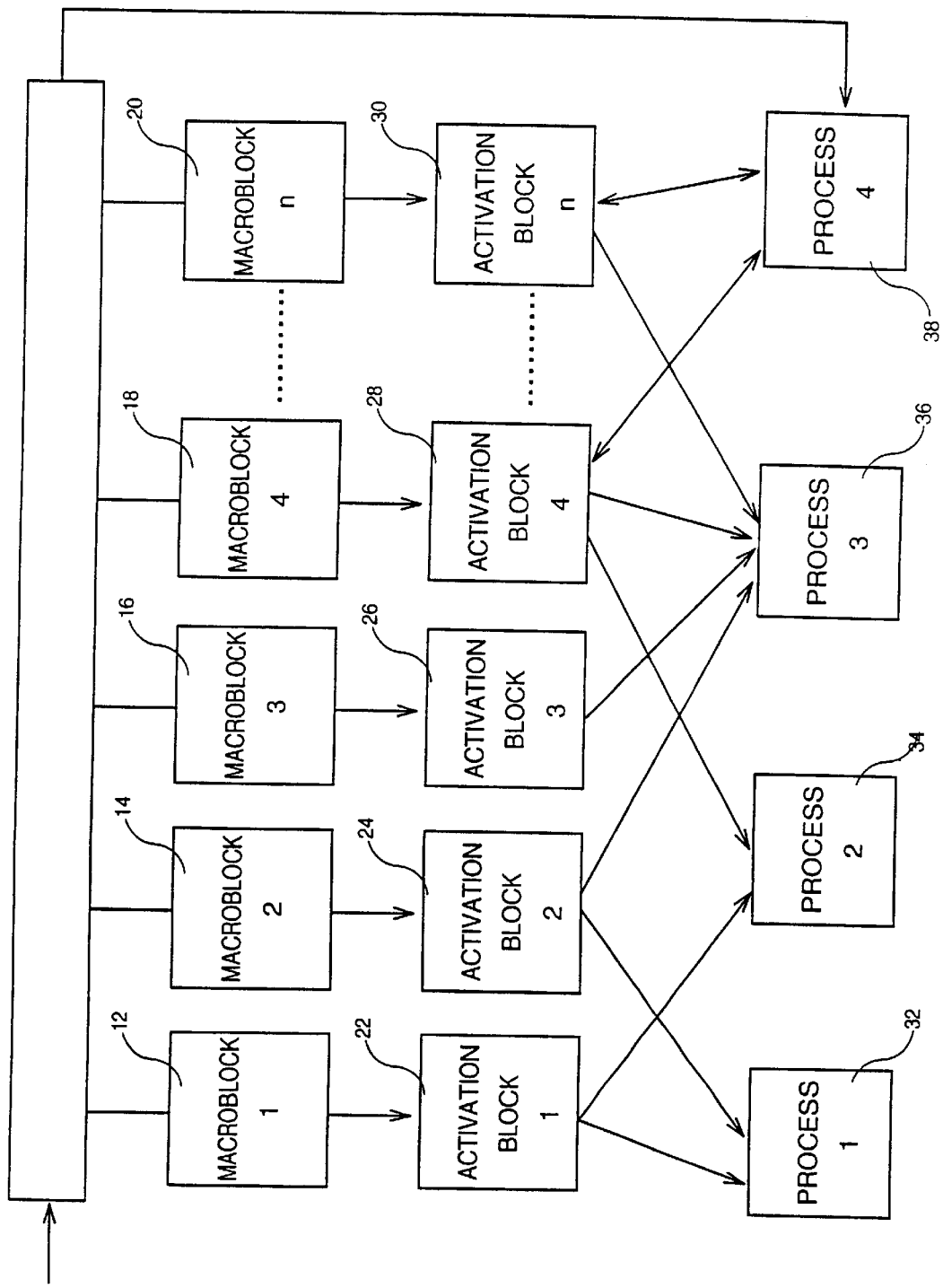
FIG. 3 represents a block diagram of the hardware device for parallel processing an instruction of a set of instructions having the same format according to the invention.

Assuming that the set of instructions comprises n instructions, a hardware device implementing the invention is illustrated in FIG. 3. An instruction register 10 is used to load the instruction to be executed. The instruction is decoded by a plurality of n hardware macroblocks 12, 14, 16, 18, 20 respectively associated with the n instructions as explained below. The output of each macroblock 12–20 is supplied to one corresponding activation block in a plurality of n activation blocks 22, 24, 26, 28, 30. The outputs of activation blocks 22–30 are all at 0 except the output of the activation block corresponding to the macroblock associated with the instruction loaded in register 10 which is at 1.

Then, the activation block receiving a 1 from its corresponding macroblock activates one or several processes which have to be run in the execution of the decoded instruction. Assuming that four processes 32, 34, 36, 38 can be run, some of them are run in an independent way whereas other ones must wait for the completion of another process to be run. For example, if activation block 22 is selected by its macroblock 12, it activates process 32 and process 34 which can be run simultaneously as shown by the arrows in FIG. 3. Likewise, activation block 24 activates simultaneously process 32 and process 36. Conversely, in case activation block 28 is selected, it must first activate process 38 and wait for its completion before simultaneously activating process 34 and process 36 which are independent processes. Note that it is possible for some processes such as process 38 to use data fields of the instruction different from the operand field (generally the operation code of the instruction) for the execution of the instruction. In such a case the required data are provided by instruction register 10 as shown in FIG. 3.

Figure 4:
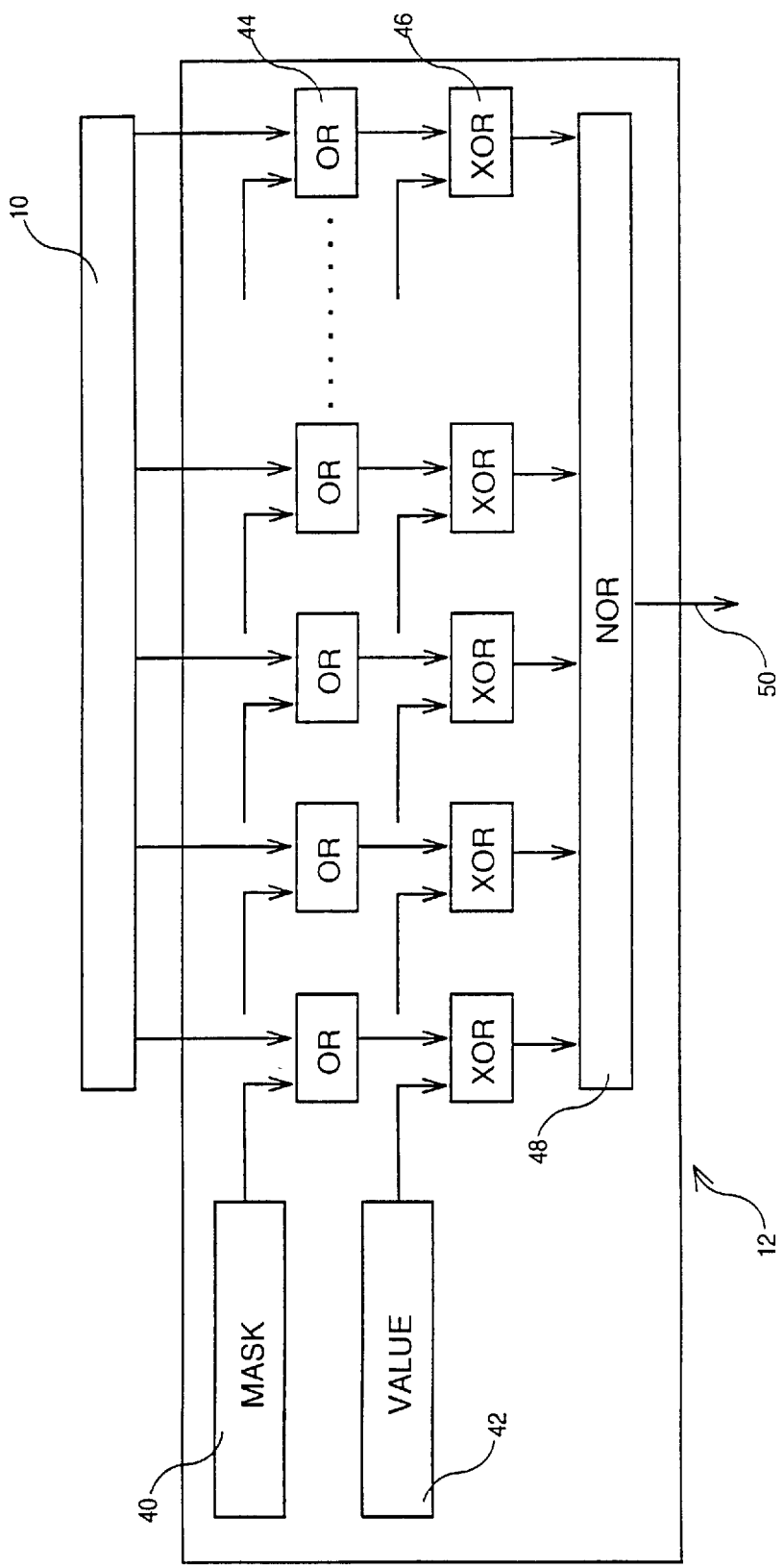
FIG. 4 represents a block diagram of a macroblock used to decode an input instruction in the hardware device according to the invention represented in FIG. 3.

Each macroblock 12, 14, 16, 18 or 20 is a hardware device which is configured according to the associated instruction as described now in reference to FIG. 4. Such a configuration is made by using a mask register 40 and a value register 42. Mask register 40 which has the same length as instruction register 10, contains bits used to mask the bits which are irrelevant for the execution of the invention. These bits are all data bits which are not operand bits in the instruction, but can also be bits of the operand field which are useless for this instruction. Thus, the instructions for a 8 bits compare and 16 bits compare are similar but 8 bits of the operation code are useless for a 8 bits compare and can be masked. In such a case, the mask enables the number of macroblocks to be reduced since several instructions are presented by a single mask. Note that in the preferred embodiment, the bits which are used as a mask are set to 1 and the other bits corresponding to relevant bits of the operand field are set to 0. Each bit of the mask register is logically combined in an OR circuit 44 (only one circuit is referenced in FIG. 4) with the corresponding bit of the instruction loaded in instruction register 10. This means that only useful bits of the operand field of the instruction keep their right value whereas the other bits corresponding to the masking bits of mask register 40 are all set to 1.

Value register 42 which has the same length as instruction register 10, contains bits identical to the useful bits of the operand field in the instruction and useless bits of the operand field or bits of other data fields are set to 1. Each bit of value register 42 is logically combined in a XOR circuit 46 (only one circuit is referenced in FIG.4) with the corresponding bit delivered by the OR circuit associated with the corresponding bit of the instruction. Then, all the bits delivered by the XOR circuit are logically combined in a NOR circuit 48. This means that the output line 50 of the NOR circuit is set to 1 only if all the outputs of the XOR circuits are 0, that is when the sequence of bits at the outputs of the OR circuits is identical to the sequence of bits loaded in value register 42. In other words, the output line 50 of the macroblock is 1 only if this macroblock is configured according to the instruction loaded in instruction register 10.

As an example, we can consider the following 4 instructions composed of an operand field and a data field. All the bits of the data field are represented by an X because they are not relevant as operation code. Likewise, some bits of the operand field which are not relevant for the execution of the invention, have been represented by X in three of the instructions.

|  | OPERAND | DATA |
|---|---|---|
| Instruction 1 | 01001011XXX011001 | XXX . . . X |
| Instruction 2 | 10101000010101100 | XXX . . . X |
| Instruction 3 | 01001011XX01X0011 | XXX . . . X |
| Instruction 4 | 10110XX01X1010001 | XXX . . . X |

For the above instructions, the mask register and the value register of the corresponding macroblocks will be configured as follows:

|  | OPERAND | DATA |
|---|---|---|
| Macroblock 1 | | |
| Instruction | 01001011XXX011001 | XXX . . . X |
| Mask register | 00000000111000000 | 111 . . . 1 |
| Value register | 01001011111011001 | 111 . . . 1 |
| Macroblock 2 | | |
| Instruction | 10101000010101100 | XXX . . . X |
| Mask register | 00000000000000000 | 111 . . . 1 |
| Value register | 10101000010101100 | 111 . . . 1 |
| Macroblock 3 | | |
| Instruction | 01001011XX01X0011 | XXX . . . X |
| Mask register | 00000000110010000 | 111 . . . 1 |
| Value register | 01001011110110011 | 111 . . . 1 |
| Macroblock 4 | | |
| Instruction | 10110XX01X1010001 | XXX . . . X |
| Mask register | 00000110010000000 | 111 . . . 1 |
| Value register | 10110110111010001 | 111 . . . 1 |

When one of the instructions is to be executed, for example instruction 2, the instruction is decoded in the four macroblocks. But only macroblock 2 provides a bit 1 as output since OR (bit by bit) between instruction 2 and the contents of the mask register is as follows:

10101000010101100 (instruction)

00000000000000000 (mask)

OR=10101000010101100

XOR (bit by bit) between this result and the contents of the value register is as follows:

10101000010101100 (OR result)

10101000010101100 (value)

XOR=00000000000000000

Then function NOR of all bits gives 1.

APPLICATION OF THE INVENTION

An interesting application of the invention is the address lookup operation in a router of an IP network consisting in searching the routing table for the longest prefix matching the destination address of the packet. To preform this lookup operation, the routing table is arranged according to a tree structure in which each table prefix is represented by a leaf of a tree. At each node of the tree is associated a numeric key on which is applied an instruction. This instruction is one of a set of instructions and determines whether the right or the left branch is to be taken in order to go on searching.

Figure 5:
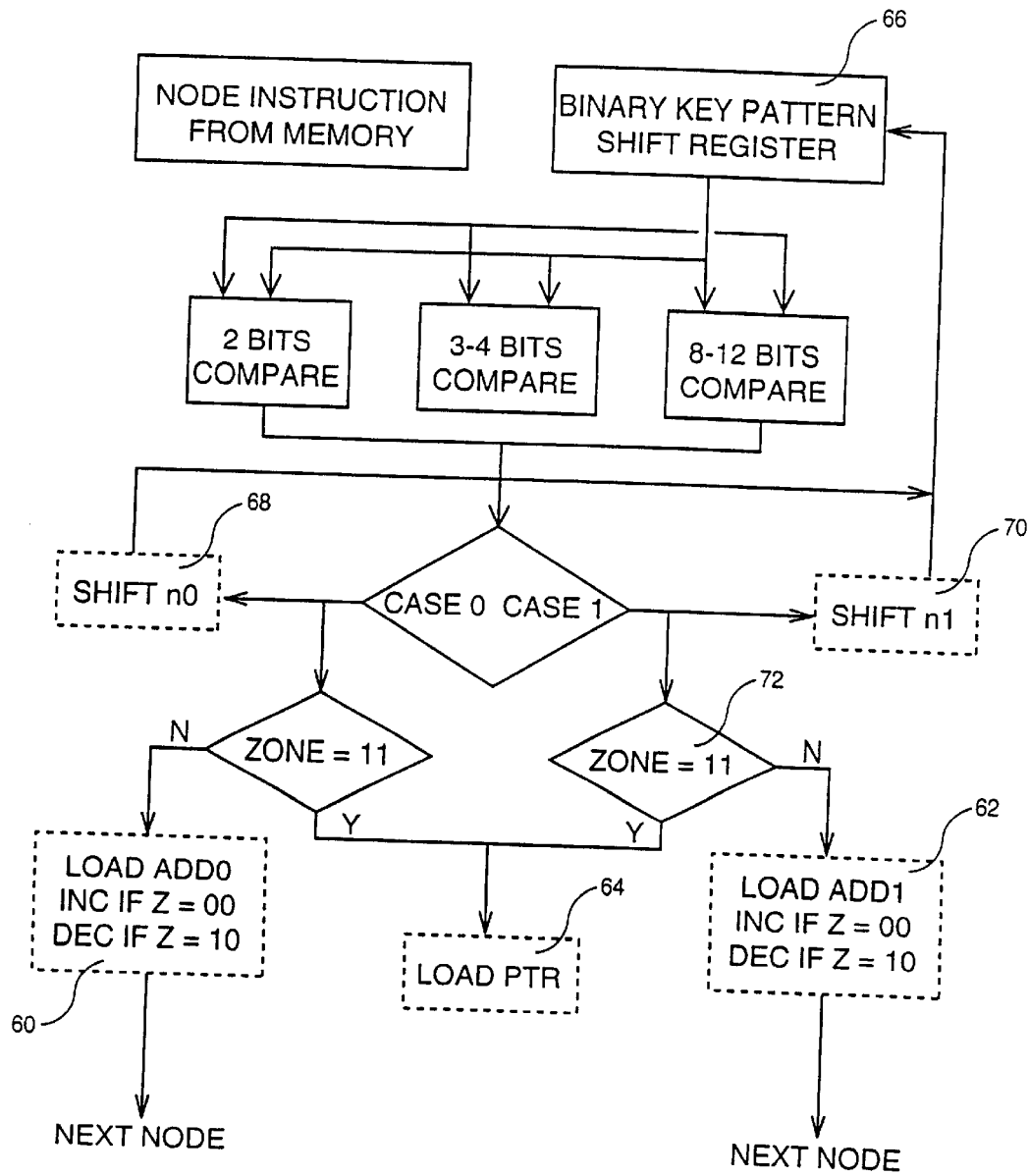
FIG. 5 is an algorithm representing a set of instructions used in the search of the IP routing address by the technique of the longest matching prefix.

The following example illustrates the case when the instruction applied to each node is a 32 bit instruction used in the framework of the description of U.S. patent application Ser. No. 245.182 filed by the applicant (hereby incorporated herein by reference thereto). As illustrated in FIG. 5 representing the algorithm of the instruction set, it is necessary to identify at each node on how many bits comparison is performed and is to be applied. Therefore, the number of bits to analyze as operand fields may be different for each instruction.

The set of instructions represented by the algorithm of FIG. 5 is as follows:

| METHOD MODE | CASE SELECT | BASIC CODE Case0 | Case1 | 11 BITS ADDRESS_LEFT | KEY VALUE or 2 TO 12 BITS PATTERN COMPARE | | |
|---|---|---|---|---|---|---|---|
| | | | | | | CASE 0 | ADDRESS |
| | | | | | | CASE 1 | ADRESS + 1 |
| | | | | | | PAGE UP | +1 MSB |
| | | | | | | PAGE EQUAL | = MSB |
| | | | | | | PAGE DOWN | −1 MSB |
| | | | | | | EXT PTR | = LSB |
| 0 | 0 0 0 | 0 0 | | | 0 0 (example 1) | SHIFTx2, | CASE 0, PAGE UP |
| 0 | 0 0 0 | 0 1 | | | 0 0 | SHIFTx2, | CASE 0, PAGE EQUAL |
| 0 | 0 0 0 | 1 0 | | | 0 0 | SHIFTx2, | CASE 0, PAGE DOWN |
| 0 | 0 0 0 | 1 1 | | | 0 0 | SHIFTx2, | CASE 0, EXTR PTR |
| 0 | 0 0 0 | | 0 0 | | 0 1 | SHIFTx2, | CASE 1, PAGE UP |
| 0 | 0 0 0 | | 0 1 | | 0 1 | SHIFTx2, | CASE 1, PAGE EQUAL |
| 0 | 0 0 0 | | 1 0 | | 0 1 | SHIFTx2, | CASE 1, PAGE DOWN |
| 0 | 0 0 0 | | 1 1 | | 0 1 | SHIFTx2, | CASE 1, EXT PTR |
| 0 | 0 0 0 | | 0 0 | | 1 0 | SHIFTx2, | CASE 1, PAGE UP |
| 0 | 0 0 0 | | 0 1 | | 1 0 | SHIFTx2, | CASE 1, PAGE EQUAL |
| 0 | 0 0 0 | | 1 0 | | 1 0 | SHIFTx2, | CASE 1, PAGE DOWN |
| 0 | 0 0 0 | | 1 1 | | 1 0 | SHIFTx2, | CASE 1, EXTR PTR |
| 0 | 0 0 0 | | 0 0 | | 1 1 | SHIFTx2, | CASE 1, PAGE UP |
| 0 | 0 0 0 | | 0 1 | | 1 1 | SHIFTx2, | CASE 1, PAGE EQUAL |
| 0 | 0 0 0 | | 1 0 | | 1 1 | SHIFTx2, | CASE 1, PAGE DOWN |
| 0 | 0 0 0 | | 1 1 | | 1 1 | SHIFTx2, | CASE 1, EXT PTR |
| 0 | 0 0 1 | | 0 0 | | 0 0 | SHIFTx2, | CASE 1, PAGE UP |
| 0 | 0 0 1 | | 0 1 | | 0 0 | SHIFTx2, | CASE 1, PAGE EQUAL |
| 0 | 0 0 1 | | 1 0 | | 0 0 | SHIFTx2, | CASE 1, PAGE DOWN |
| 0 | 0 0 1 | | 1 1 | | 0 0 | SHIFTx2, | CASE 1, EXT PTR |
| 0 | 0 0 1 | 0 0 | | | 0 1 | SHIFTx2, | CASE 0, PAGE UP |
| 0 | 0 0 1 | 0 1 | | | 0 1 | SHIFTx2, | CASE 0, PAGE EQUAL |
| 0 | 0 0 1 | 1 0 | | | 0 1 | SHIFTx2, | CASE 0, PAGE DOWN |
| 0 | 0 0 1 | 1 1 | | | 0 1 | SHIFTx2, | CASE 0, EXT PTR |
| 0 | 0 0 1 | | 0 0 | | 1 0 | SHIFTx2, | CASE 1, PAGE UP |
| 0 | 0 0 1 | | 0 1 | | 1 0 | SHIFTx2, | CASE 1, PAGE EQUAL |
| 0 | 0 0 1 | | 1 0 | | 1 0 | SHIFTx2, | CASE 1, PAGE DOWN |
| 0 | 0 0 1 | | 1 1 | | 1 0 (example 2) | SHIFTx2, | CASE 1, EXT PTR |
| 0 | 0 0 1 | | 0 0 | | 1 1 | SHIFTx2, | CASE 1, PAGE UP |
| 0 | 0 0 1 | | 0 1 | | 1 1 | SHIFTx2, | CASE 1, PAGE EQUAL |
| 0 | 0 0 1 | | 1 0 | | 1 1 | SHIFTx2, | CASE 1, PAGE DOWN |
| 0 | 0 0 1 | | 1 1 | | 1 1 | SHIFTx2, | CASE 1, EXT PTR |
| 0 | 0 1 0 | | 0 0 | | 0 0 | SHIFTx2, | CASE 1, PAGE UP |
| 0 | 0 1 0 | | 0 1 | | 0 0 | SHIFTx2, | CASE 1, PAGE EQUAL |
| 0 | 0 1 0 | | 1 0 | | 0 0 | SHIFTx2, | CASE 1, PAGE DOWN |
| 0 | 0 1 0 | | 1 1 | | 0 0 | SHIFTx2, | CASE 1, EXT PTR |
| 0 | 0 1 0 | | 0 0 | | 0 1 | SHIFTx2, | CASE 1, PAGE UP |
| 0 | 0 1 0 | | 0 1 | | 0 1 | SHIFTx2, | CASE 1, PAGE EQUAL |
| 0 | 0 1 0 | | 1 0 | | 0 1 | SHIFTx2, | CASE 1, PAGE DOWN |
| 0 | 0 1 0 | | 1 1 | | 0 1 | SHIFTx2, | CASE 1, EXT PTR |
| 0 | 0 1 0 | 0 0 | | | 1 0 | SHIFTx2, | CASE 0, PAGE UP |
| 0 | 0 1 0 | 0 1 | | | 1 0 | SHIFTx2, | CASE 0, PAGE EQUAL |
| 0 | 0 1 0 | 1 0 | | | 1 0 | SHIFTx2, | CASE 0, PAGE DOWN |
| 0 | 0 1 0 | 1 1 | | | 1 0 | SHIFTx2, | CASE 0, EXT PTR |
| 0 | 0 1 0 | | 0 0 | | 1 1 | SHIFTx2, | CASE 1, PAGE UP |
| 0 | 0 1 0 | | 0 1 | | 1 1 | SHIFTx2, | CASE 1, PAGE EQUAL |
| 0 | 0 1 0 | | 1 0 | | 1 1 | SHIFTx2, | CASE 1, PAGE DOWN |
| 0 | 0 1 0 | | 1 1 | | 1 1 | SHIFTx2, | CASE 1, EXT PTR |
| 0 | 0 1 1 | | 0 0 | | 0 0 | SHIFTx2, | CASE 1, PAGE UP |
| 0 | 0 1 1 | | 0 1 | | 0 0 | SHIFTx2, | CASE 1, PAGE EQUAL |
| 0 | 0 1 1 | | 1 0 | | 0 0 | SHIFTx2, | CASE 1, PAGE DOWN |
| 0 | 0 1 1 | | 1 1 | | 0 0 | SHIFTx2, | CASE 1, EXT PTR |
| 0 | 0 1 1 | | 0 0 | | 0 1 | SHIFTx2, | CASE 1, PAGE UP |

-continued

| MODE | CASE SELECT | BASIC CODE Case0 | BASIC CODE Case1 | 11 BITS ADDRESS_LEFT | KEY VALUE or 2 TO 12 BITS PATTERN COMPARE | | METHOD |
|---|---|---|---|---|---|---|---|
| 0 | 0 1 1 | | 0 1 | 0 1 | | SHIFTx2, | CASE 1, PAGE EQUAL |
| 0 | 0 1 1 | | 1 0 | 0 1 | | SHIFTx2, | CASE 1, PAGE DOWN |
| 0 | 0 1 1 | | 1 1 | 0 1 | | SHIFTx2, | CASE 1, EXT PTR |
| 0 | 0 1 1 | | 0 0 | 1 0 | | SHIFTx2, | CASE 1, PAGE UP |
| 0 | 0 1 1 | | 0 1 | 1 0 | | SHIFTx2, | CASE 1, PAGE EQUAL |
| 0 | 0 1 1 | | 1 0 | 1 0 | | SHIFTx2, | CASE 1, PAGE DOWN |
| 0 | 0 1 1 | | 1 1 | 1 0 | | SHIFTx2, | CASE 1, EXT PTR |
| 0 | 0 1 1 | 0 0 | | 1 1 | | SHIFTx2, | CASE 0, PAGE UP |
| 0 | 0 1 1 | 0 1 | | 1 1 | | SHIFTx2, | CASE 0, PAGE EQUAL |
| 0 | 0 1 1 | 1 0 | | 1 1 | | SHIFTx2, | CASE 0, PAGE DOWN |
| 0 | 0 1 1 | 1 1 | | 1 1 | | SHIFTx2, | CASE 0, EXT PTR |
| 0 | 1 0 0 | 0 0 | | 0 0 | | SHIFTx1, | CASE 0, PAGE UP |
| 0 | 1 0 0 | 0 1 | | 0 0 | | SHIFTx1, | CASE 0, PAGE EQUAL |
| 0 | 1 0 0 | 1 0 | | 0 0 | | SHIFTx1, | CASE 0, PAGE DOWN |
| 0 | 1 0 0 | 1 1 | | 0 0 | | SHIFTx1, | CASE 0, EXT PTR |
| 0 | 1 0 0 | 0 0 | | 0 1 | | SHIFTx1, | CASE 0, PAGE UP |
| 0 | 1 0 0 | 0 1 | | 0 1 | | SHIFTx1, | CASE 0, PAGE EQUAL |
| 0 | 1 0 0 | 1 0 | | 0 1 | | SHIFTx1, | CASE 0, PAGE DOWN |
| 0 | 1 0 0 | 1 1 | | 0 1 | | SHIFTx1, | CASE 0, EXT PTR |
| 0 | 1 0 0 | | 0 0 | 1 0 | | SHIFTx1, | CASE 1, PAGE UP |
| 0 | 1 0 0 | | 0 1 | 1 0 | | SHIFTx1, | CASE 1, PAGE EQUAL |
| 0 | 1 0 0 | | 1 0 | 1 0 | | SHIFTx1, | CASE 1, PAGE DOWN |
| 0 | 1 0 0 | | 1 1 | 1 0 | | SHIFTx1, | CASE 1, EXT PTR |
| 0 | 1 0 0 | | 0 0 | 1 1 | | SHIFTx1, | CASE 1, PAGE UP |
| 0 | 1 0 0 | | 0 1 | 1 1 | | SHIFTx1, | CASE 1, PAGE EQUAL |
| 0 | 1 0 0 | | 1 0 | 1 1 | | SHIFTx1, | CASE 1, PAGE DOWN |
| 0 | 1 0 0 | | 1 1 | 1 1 | | SHIFTx1, | CASE 1, EXT PTR |
| 0 | 1 0 1 | 0 0 | | 0 0 | | SHIFTx1, | CASE 0, PAGE UP |
| 0 | 1 0 1 | 0 1 | | 0 0 | | SHIFTx1, | CASE 0, PAGE EQUAL |
| 0 | 1 0 1 | 1 0 | | 0 0 | | SHIFTx1, | CASE 0, PAGE DOWN |
| 0 | 1 0 1 | 1 1 | | 0 0 | | SHIFTx1, | CASE 0, EXT PTR |
| 0 | 1 0 1 | | 0 0 | 0 1 | | SHIFTx1, | CASE 1, PAGE UP |
| 0 | 1 0 1 | | 0 1 | 0 1 | | SHIFTx1, | CASE 1, PAGE EQUAL |
| 0 | 1 0 1 | | 1 0 | 0 1 | | SHIFTx1, | CASE 1, PAGE DOWN |
| 0 | 1 0 1 | | 1 1 | 0 1 | | SHIFTx1, | CASE 1, EXT PTR |
| 0 | 1 0 1 | 0 0 | | 1 0 | | SHIFTx1, | CASE 0, PAGE UP |
| 0 | 1 0 1 | 0 1 | | 1 0 | | SHIFTx1, | CASE 0, PAGE EQUAL |
| 0 | 1 0 1 | 1 0 | | 1 0 | | SHIFTx1, | CASE 0, PAGE DOWN |
| 0 | 1 0 1 | 1 1 | | 1 0 | | SHIFTx1, | CASE 0, EXT PTR |
| 0 | 1 0 1 | | 0 0 | 1 1 | | SHIFTx1, | CASE 1, PAGE UP |
| 0 | 1 0 1 | | 0 1 | 1 1 | | SHIFTx1, | CASE 1, PAGE EQUAL |
| 0 | 1 0 1 | | 1 0 | 1 1 | | SHIFTx1, | CASE 1, PAGE DOWN |
| 0 | 1 0 1 | | 1 1 | 1 1 | | SHIFTx1, | CASE 1, EXT PTR |
| 0 | 1 1 0 | 0 0 | | 0 0 | | SHIFTx1, | CASE 0, PAGE UP |
| 0 | 1 1 0 | 0 1 | | 0 0 | | SHIFTx1, | CASE 0, PAGE EQUAL |
| 0 | 1 1 0 | 1 0 | | 0 0 | | SHIFTx1, | CASE 0, PAGE DOWN |
| 0 | 1 1 0 | 1 1 | | 0 0 | | SHIFTx1, | CASE 0, EXT PTR |
| 0 | 1 1 0 | | 0 0 | 0 1 | | SHIFTx1, | CASE 1, PAGE UP |
| 0 | 1 1 0 | | 0 1 | 0 1 | | SHIFTx1, | CASE 1, PAGE EQUAL |
| 0 | 1 1 0 | | 1 0 | 0 1 | | SHIFTx1, | CASE 1, PAGE DOWN |
| 0 | 1 1 0 | | 1 1 | 0 1 | | SHIFTx1, | CASE 1, EXT PTR |
| 0 | 1 1 0 | | 0 0 | 1 0 | | SHIFTx1, | CASE 1, PAGE UP |
| 0 | 1 1 0 | | 0 1 | 1 0 | | SHIFTx1, | CASE 1, PAGE EQUAL |
| 0 | 1 1 0 | | 1 0 | 1 0 | | SHIFTx1, | CASE 1, PAGE DOWN |
| 0 | 1 1 0 | | 1 1 | 1 0 | | SHIFTx1, | CASE 1, EXT PTR |
| 0 | 1 1 0 | 0 0 | | 1 1 | | SHIFTx1, | CASE 0, PAGE UP |
| 0 | 1 1 0 | 0 1 | | 1 1 | | SHIFTx1, | CASE 0, PAGE EQUAL |
| 0 | 1 1 0 | 1 0 | | 1 1 | | SHIFTx1, | CASE 0, PAGE DOWN |
| 0 | 1 1 0 | 1 1 | | 1 1 | | SHIFTx1, | CASE 0, EXT PTR |
| 1 | 1 1 1 | 0 | 0 0 | | 00 01 02 | SHIFTx3, | CASE 0, PAGE UP |
| 1 | 1 1 1 | 0 | 0 1 | | 00 01 02 | SHIFTx3, | CASE 0, PAGE EQUAL |
| 1 | 1 1 1 | 0 | 1 0 | | 00 01 02 | SHIFTx3, | CASE 0, PAGE DOWN |
| 1 | 1 1 1 | 0 | 1 1 | | 00 01 02 | SHIFTx3, | CASE 0, EXT PTR |
| 1 | 1 1 1 | 0 | 0 0 | | ^( 00 01 02) | — | CASE 1, PAGE UP |
| 1 | 1 1 1 | 0 | 0 1 | | ^( 00 01 02) | — | CASE 1, PAGE EQUAL |
| 1 | 1 1 1 | 0 | 1 0 | | ^( 00 01 02) | — | CASE 1, PAGE DOWN |
| 1 | 1 1 1 | 0 | 1 1 | | ^( 00 01 02) | — | CASE 1, EXT PTR |
| 1 | 1 1 0 | 0 | 0 0 | | 00 01 02 03 | SHIFTx4, | CASE 0, PAGE UP |
| 1 | 1 1 0 | 0 | 0 1 | | 00 01 02 03 (example 3) | SHIFTx4, | CASE 0, PAGE EQUAL |
| 1 | 1 1 0 | 0 | 1 0 | | 00 01 02 03 | SHIFTx4, | CASE 0, PAGE DOWN |
| 1 | 1 1 0 | 0 | 1 1 | | 00 01 02 03 | SHIFTx4, | CASE 0, EXT PTR |
| 1 | 1 1 0 | 0 | 0 0 | | ^( 00 01 02 03) | — | CASE 1, PAGE UP |
| 1 | 1 1 0 | 0 | 0 1 | | ^( 00 01 02 03) | — | CASE 1, PAGE EQUAL |

-continued

| METHOD | | | | | | | |
|---|---|---|---|---|---|---|---|
| MODE | CASE SELECT | BASIC CODE Case0 | Case1 | 11 BITS ADDRESS_LEFT | KEY VALUE or 2 TO 12 BITS PATTERN COMPARE | | |
| 1 | 1 1 0 | 0 | | 1 0 | ( 00 01 02 03) (example 4) | — | CASE 1, PAGE DOWN |
| 1 | 1 1 0 | 0 | | 1 1 | ( 00 01 02 03) | — | CASE 1, EXT PTR |
| 1 | 1 0 1 | 0 | 0 0 | | 00 01 02 03 04 05 06 07 | SHIFTx8, | CASE 0, PAGE UP |
| 1 | 1 0 1 | 0 | 0 1 | | 00 01 02 03 04 05 06 07 | SHIFTx8, | CASE 0, PAGE EQUAL |
| 1 | 1 0 1 | 0 | 1 0 | | 00 01 02 03 04 05 06 07 | SHIFTx8, | CASE 0, PAGE DOWN |
| 1 | 1 0 1 | 0 | 1 1 | | 00 01 02 03 04 05 06 07 | SHIFTx8, | CASE 0, EXT PTR |
| 1 | 1 0 1 | 0 | | 0 0 | ( 00 01 02 03 04 05 06 07 | — | CASE 1, PAGE UP |
| 1 | 1 0 1 | 0 | | 0 1 | ( 00 01 02 03 04 05 06 07 | — | CASE 1, PAGE EQUAL |
| 1 | 1 0 1 | 0 | | 1 0 | ( 00 01 02 03 04 05 06 07 | — | CASE 1, PAGE DOWN |
| 1 | 1 0 1 | 0 | | 1 1 | ( 00 01 02 03 04 05 06 07 | — | CASE 1, EXT PTR |
| 1 | 1 0 0 | 0 | 0 0 | | 00 01 02 03 04 05 06 07 08 09 0A 0B | SHIFTx12, | CASE 0, PAGE UP |
| 1 | 1 0 0 | 0 | 0 1 | | 00 01 02 03 04 05 06 07 08 09 0A 0B | SHIFTx12, | CASE 0, PAGE EQUAL |
| 1 | 1 0 0 | 0 | 1 0 | | 00 01 02 03 04 05 06 07 08 09 0A 0B | SHIFTx12, | CASE 0, PAGE DOWN |
| 1 | 1 0 0 | 0 | 1 1 | | 00 01 02 03 04 05 06 07 08 09 0A 0B | SHIFTx12, | CASE 0, EXT PTR |
| 1 | 1 0 0 | 0 | | 0 0 | ( 00 01 02 03 04 05 06 07 08 09 0A 0B) | — | CASE 1, PAGE UP |
| 1 | 1 0 0 | 0 | | 0 1 | ( 00 01 02 03 04 05 06 07 08 09 0A 0B) | — | CASE 1, PAGE EQUAL |
| 1 | 1 0 0 | 0 | | 1 0 | ( 00 01 02 03 04 05 06 07 08 09 0A 0B) | — | CASE 1, PAGE DOWN |
| 1 | 1 0 0 | 0 | | 1 1 | ( 00 01 02 03 04 05 06 07 08 09 0A 0B) | — | CASE 1, EXT PTR |

The first METHOD field of the instruction start with a bit having value 0 in the subfield MODE. This corresponds to a binary sort where only two possibilities are available on each sort: case 0 and case 1. The address for case 0 is available on each sort: case O and case 1. The address for case O is available within a field called "11 BITS ADDRESS LEFT" while the address for case 1 is the address just after the case 0 address and is called address+1.

The bit of the subfield CASE SELECT indicate the method to differentiate the two bits analyzed from the key according to the following table:

| CASE SELECT | CASE 0 if | CASE 1 if |
|---|---|---|
| 000 | 00 | 01,10,11 |
| 001 | 01 | 00,10,11 |
| 010 | 10 | 00,01,11 |
| 011 | 11 | 00,01,10 |
| 100 | 00,01 | 10,11 |
| 101 | 00,10 | 01,11 |
| 110 | 00,11 | 01,10 |

The field ACTION corresponds to the two zone indications for CASE 0 and CASE 1 and indicates whether a new node should be loaded (60 or 62 in FIG. 5) with the different page modifications or if the sort is campleted and the final point (PTR) should be loaded as a result of the sort (64).

The two next bits indicate the number of bits to shift in the analyzed pattern for the next pattern analysis. One bit gives the value if the left side (CASE 0) is selected, one bit gives the shift value for the right side (CASE 1). The shift is either 1 or 2 bits.

If MODE bit is 1, the last field indicates a comparison of 2 to 12 bits of the analyzed pattern at the current position with the 2 to 12 bits D0, D1, . . . of the instruction. If their value is the same, CASE 0 is selected. Otherwise, CASE 1 is selected.

The following examples 1 to 4 relate to four instructions indicated in the above set of instructions, the sequences of bits to be loaded in the MASK and VALUE registers for the corresponding macroblocks and the explanation of the algorithm flow to be used in reference to FIG. 5

EXAMPLE 1

INSTRUCTION
 0000X00XXXXXXXXXXXXXXXXXXXXXXXXX
MASK 000010011111111111111111111111
VALUE 000010011111111111111111111111
The key corresponds to 00 (represented for better understanding in 2 to 12 BITS PATTERN COMPARE field but is in fact present in another register called Binary key pattern shift register.
This instruction performs 3 actions determined by:
 shiftx2, CASE0 and page up.
 Shiftx2 corresponds to a 2 bits shift in register 66 initiated by block 68 CASE0 is selected which also performs the load of the next instruction stored at the address contained in the 11 bits address_left field. In addition page up increments MSB bits of the address in order to select an higher page in memory.

EXAMPLE 2

INSTRUCTION
 0001XXX11XXXXXXXXXXXXXXXXXXXXXXX
MASK 000011100111111111111111111111
VALUE 000111111111111111111111111111
The key corresponds to 10 (represented for better understanding in 2 to 12 BITS PATTERN COMPARE field but is in fact present in another register called Binary key pattern shift register 66.
This instruction performs 3 actions determined by:
 shiftx2, CASE1 and ext. ptr.
 Shiftx2 corresponds to a 2 bits shift in register 66 initiated by block 70 as CASE1 is selected which also performs the load of the PTR register as the CASE1 field in basic code has 11 as value corresponding to the y case of block 72.

EXAMPLE 3

INSTRUCTION
 1110001XXXXXXXXXXXXXXXXXXXXXXXXX
MASK 000000011111111111111111111111
VALUE 111000111111111111111111111111

The 4 bits following the pointer in binary key pattern shift register 66 are matching the 4 data bits D0 D1 D2 D3 in 2_to_12_BITS_PATTERN_COMPARE field.

This instruction performs 2 actions determined by:

shift4, CASE0 and page equal.

It corresponds to a 4 bits shift in register 66 initiated by block 68. CASE0 is selected as the match is found and the load of the next address found in 11_bits_address_left is made in the same page as page equal is associated with this case.

EXAMPLE 4

INSTRUCTION 11100XX10XXXXXXXXXXXXXXXXXXXXXXXX

MASK 00000110011111111111111111111111

VALUE 11100111011111111111111111111111

The 4 bits following the pointer in binary key pattern shift register 66 are not matching the 4 data bits D0 D1 D2 D3 in 2_to_12 BITS_PATTERN_COMPARE field. It corresponds to ^D0 D1 D2 D3 meaning not matching.

This instruction performs 3 actions determined by: CASE1 and page down.

It corresponds to a no shift action in register 66 initiated by block 68. Case 1 is selected as the match is not found and the load of the next address found in 11_bits_address_left+1 is made in the previous page (MSB bits−1) as page down is associated with this case.

Of course, the device according to the invention implemented in the above application could be used for the determination of a right path corresponding to an input search key from the root to a leaf of a binary tree wherein each specific instruction is associated to a node of the tree and is applied to a key in order to determine the next node to be processed.

While the invention has been particularly shown and described with respect to preferred embodiments thereof, it will be understood by those skilled in the art that the foregoing and other changes in form and details may be made therein without departing form the spirit and scope of the invention.

Having thus described our invention, what we claim as new, and desire to secure by Letters Patent is:

1. A hardware device for parallel processing a determined instruction of a set of instructions having a same format defining operand fields and other data fields, the execution of each of the set of instructions being represented as an algorithm comprising one or more of a plurality of processes, the processing of which depending on decisions; said device comprising:

means for activating the processing of one or several processes determined by said operand fields, a plurality of decision macroblocks operatively associated with the means for activating, each of the macroblocks being associated with a specific one of said set of instructions, only one of the decision macroblocks being selected by a determined one of the set of instructions in order to determine which one or more of the plurality of processes to be activated by the means for activating for executing said determined instruction.

2. The device according to claim 1, wherein each of said decision macroblocks comprises a mask register having the same length of said determined instruction and including a mask for masking the bits of said other data fields and a value register including a value having the same length of said determined instruction and including a defined part corresponding and being identical to said operand fields of said specific instruction, and combinatory logic means for logically combining said determined instruction with the contents of said mask register and the contents of said value register so that the output of said macroblock is preset value only when said determined instruction is said specific instruction associated with said macroblock.

3. The device according to claim 2, wherein said combinatory logic comprises:

a plurality of OR circuits the number of which is identical to the number of instruction bits, for obtaining bit by bit the OR function between the bits of said determined instruction and said mask in said mask register a plurality of XOR circuits the number of which is identical to the number of instruction bits for obtaining bit by bit the XOR function between the bits obtained at the output of said OR circuits and the bits of said value in said value register and a NOR circuit for combining all bits obtained at the output of said XOR circuits and providing said preset value only when said determined instruction is said specific instruction associated with said macroblock.

4. The device according to claim 2, wherein said mask contained in mask register is further used for masking the bits of said operand fields in said specific instruction which are useless for said specific instruction, thereby reducing the number of said macroblocks.

5. The device according to claim 1, wherein each of said macroblocks is associated with a specific instruction applied to a key associated with each node of a binary tree in order to determine next node to be processed for finding the sequence of nodes from the root of the tree to a leaf corresponding to and input search key.

6. The device according to claim 5, wherein said binary tree corresponds to a routing table of a router in an IP network, said path from the root of the tree to a leaf corresponding to the determination of the longest prefix matching said search key.

\* \* \* \* \*